(12) United States Patent
Walters

(10) Patent No.: US 8,270,189 B2
(45) Date of Patent: Sep. 18, 2012

(54) CHARGE CIRCUIT FOR OPTIMIZING GATE VOLTAGE FOR IMPROVED EFFICIENCY

(75) Inventor: Michael M. Walters, Apex, NC (US)

(73) Assignee: International Rectifier Corporation, El Segundo, CA (US)

( * ) Notice: Subject to any disclaimer, the term of this patent is extended or adjusted under 35 U.S.C. 154(b) by 907 days.

(21) Appl. No.: 12/130,506

(22) Filed: May 30, 2008

(65) Prior Publication Data

US 2008/0303584 A1    Dec. 11, 2008

Related U.S. Application Data

(60) Provisional application No. 60/941,161, filed on May 31, 2007.

(51) Int. Cl.
*H02M 3/07* (2006.01)
(52) U.S. Cl. .............................................. 363/59
(58) Field of Classification Search .............. 363/59–60; 327/536; 257/299
See application file for complete search history.

(56) References Cited

U.S. PATENT DOCUMENTS

| | | | | | |
|---|---|---|---|---|---|
| 5,258,662 | A | * | 11/1993 | Skovmand | 327/544 |
| 5,359,244 | A | * | 10/1994 | Hopkins | 327/434 |
| 5,940,283 | A | * | 8/1999 | Mihara et al. | 363/60 |
| 6,018,264 | A | * | 1/2000 | Jin | 327/536 |
| 7,248,028 | B1 | * | 7/2007 | Voo | 323/282 |
| 2005/0268126 | A1 | | 12/2005 | Lee | |
| 2006/0038547 | A1 | * | 2/2006 | Ahmad | 323/284 |
| 2006/0226890 | A1 | | 10/2006 | Dadashev | |
| 2007/0024347 | A1 | | 2/2007 | Nagasawa et al. | |

OTHER PUBLICATIONS

International Search Report dated Sep. 4, 2008 corresponding to International Patent Application PCT/US/08/06933.

* cited by examiner

*Primary Examiner* — Harry Behm
(74) *Attorney, Agent, or Firm* — Farjami & Farjami LLP

(57) ABSTRACT

A charge circuit for providing a gate driver supply voltage for a gate driver of a switching power supply in accordance with an embodiment of the present application includes a first voltage source providing a first voltage and a charge pump circuit connected to the first voltage source and operable to be turned ON and OFF to improve efficiency such that an increased output voltage of the charge circuit is provided when the charge pump circuit is ON, and wherein the output voltage is the gate driver supply voltage.

11 Claims, 2 Drawing Sheets

CHARGE CIRCUIT FOR OPTIMIZING GATE VOLTAGE FOR IMPROVED EFFICIENCY

CROSS-REFERENCE TO RELATED APPLICATIONS

The present application claims benefit of and priority to U.S. Provisional Patent Application Ser. No. 60/941,161 entitled CHARGE PUMP FOR INCREASING EFFICIENCY filed May 31, 2007, the entire contents of which are hereby incorporated by reference herein.

BACKGROUND

1. Field of the Disclosure

The present invention relates to a charge circuit including a charge pump circuit that provides increased efficiency in the circuit in which it operates. More specifically, the charge pump circuit can be turned ON and OFF as desired to improve overall efficiency of the circuit in which it is being used.

2. Related Art

It is common to provide a charge circuit, often including a charge pump, in switching power supplies such as DC-DC converters, for example, to provide a gate driver supply voltage. Under high load conditions it is preferable to provide an increased gate driver supply voltage. However, when the load is low, it is generally better not to provide such an enhanced gate driver supply voltage since this contributes more substantially to overall circuit losses when a smaller load is present.

Accordingly, it would be desirable to provide a charging circuit that avoids these problems.

SUMMARY

It is an object of the present invention to provide a charge circuit preferably for use in a switching power supply with a charge pump circuit that is selectively turned ON and OFF to improve efficiency.

A charge circuit for providing a gate driver supply voltage for a gate driver of a switching power supply in accordance with an embodiment of the present application includes a first voltage source providing a first voltage and a charge pump circuit connected to the first voltage source and operable to be turned ON and OFF to improve efficiency such that an increased output voltage of the charge circuit is provided when the charge pump circuit is ON, and wherein the output voltage is the gate driver supply voltage.

A charge pump circuit connected to a load in accordance with an embodiment of the present application includes a voltage source providing a voltage, a first switch connected to the voltage source, a second switch connected is series with the first switch and a control unit operable to provide a control signal to the first switch and the second switch to selectively turn the first and second switch ON and OFF to control a desired voltage at a first node positioned between the first and second switches, wherein the control unit turns both the first switch and the second switch ON and OFF based on a load size of the load connected to the charge pump circuit to increase efficiency.

A charge circuit for providing a gate driver supply voltage for a gate driver of a switching power supply in accordance with an embodiment of the present application includes at least one voltage source providing a first voltage and a charge pump circuit connected to the first voltage source and operable to be turned ON and OFF to improve efficiency of the switching power supply, wherein the charge pump circuit is turned ON to increase the output voltage of the charge circuit above the first voltage when a large load is connected to the switching power supply.

Other features and advantages of the present invention will become apparent from the following description of the invention which refers to the accompanying drawings.

BRIEF DESCRIPTION OF THE DRAWING(S)

DETAILED DESCRIPTION OF THE EMBODIMENTS

The charge circuit of the present application provides increased efficiency by providing a higher gate driver supply voltage when necessary, i.e., during high load usage, and a reduced gate driver supply voltage during light load conditions. At full or high load levels, it is desirable to have a higher gate drive supply voltage to reduce conduction losses ($I^2 \cdot R$) which predominate under these conditions. At light loads, however, the $I^2R$ losses (conduction losses) are smaller and the gate drive losses ($CV^2$) predominate, so a lower gate driver supply voltage provides increased efficiency. This can be seen in FIG. 2, for example.

Figure 1:
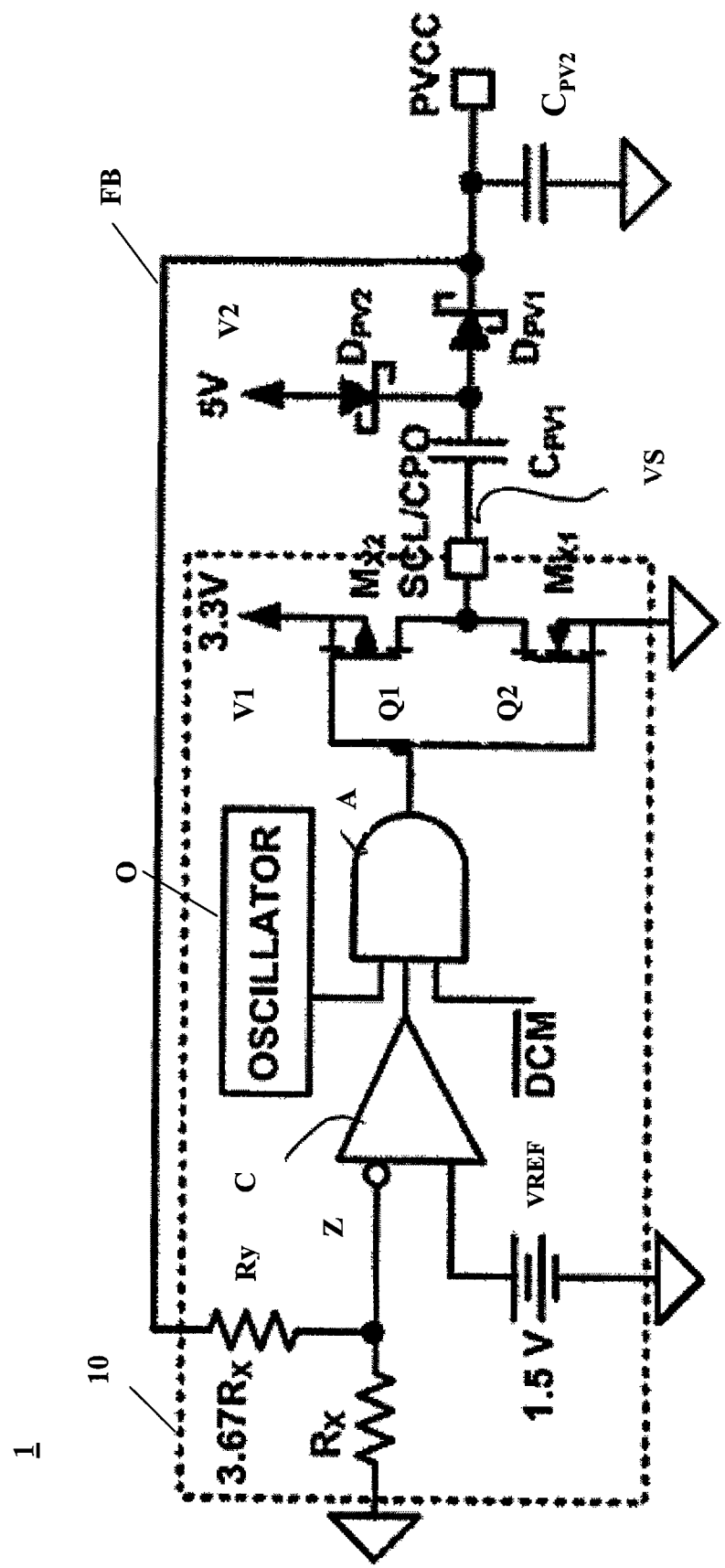
FIG. 1 is an illustration of a charge circuit in accordance with an embodiment of the present application.

The charge circuit 1 of the present application preferably provides both an increased gate driver supply voltage and a lower "standard" gate driver supply voltage. The gate driver supply voltage is preferably provided to the gate driver which is in turn connected to the control electrode(s), or gate(s), of one or more switches in a switching power supply, such as a DC-DC converter, for example. The supply voltage corresponds to the highest driving voltage that is provided to these control electrodes to turn the switches ON. As can be seen in FIG. 1, the charge circuit 1 utilizes two power supplies, or voltage sources, for example a 5 volt (V2) and a 3.3 volt (V1) supply. It is noted that the values of 5V and 3.3V provided by the voltage sources V2 and V1, respectively, are merely exemplary and any suitable values may be used. The charge circuit 1 also includes a charge pump circuit 10 that can be selectively turned ON to provide the increased gate driver supply voltage and OFF when the increased supply voltage is not beneficial.

The output node PVCC of the charge circuit 1 preferably supplies a gate driver (not shown) of a voltage converter circuit, for example. The output node PVCC is connected to the second voltage supply V2 via the diodes $D_{PV2}$, $D_{PV1}$. Thus, when the charge pump circuit 10 is OFF, the output voltage at node PVCC is 5 volts less the 2 diode drops ($D_{PV2}$, $D_{PV1}$) (i.e., 5V−2×0.3V=4.4 V). This is the lower, "standard" gate driver supply voltage. As is noted above, the charge pump circuit 10 may be turned ON to provide an increased output voltage to supply the gate driver. With the charge pump circuit 10 ON, the output voltage at node PVCC is approximately 7V, as is described further below.

The charge pump circuit 10 preferably includes the power supply V1 and two FETs Q1 and Q2 coupled between voltage source V1 (3.3V in FIG. 1) and ground. The second voltage source V2 (5V in FIG. 1) is coupled via diode $D_{PV2}$ to the node VS, positioned between the switches Q1 and Q2 by a capacitor CPV1 and to the output node PVCC by diode $D_{PV1}$. A capacitor $C_{PV2}$ filters the output voltage provided at the output node PVCC. The switches Q1 and Q2 are preferably complementary MOS transistors, i.e., PMOS and NMOS. The AND gate A preferably has three inputs connected to the output from comparator C, the output of oscillator O and a DCM (discontinuous conduction mode) not signal, respectively.

The inverting input of the comparator C is preferably coupled to the voltage divider formed by resistors Rx and Ry (here 3.67 $R_X$) which provides a divided signal indicative of the output voltage provided at node PVCC. The values of the resistors Rx and Ry may be any desired values. A feed back signal FB s preferably supplied to the resistors Rx, Ry of the voltage divider circuit representing the output voltage provided at the output node PVCC. The divided signal is provided from the divider based on the feed back signal FB and is compared to the reference voltage VREF (1.25V in FIG. 1, for example) such that an output shut down signal of the comparator C goes low when the divided signal exceeds VREF. That is, the shut down signal goes low when the output voltage indicated by the divided signal falls below a desired threshold, represented by the reference voltage VREF. In the example of FIG. 1, the reference voltage VREF is 1.25 volts, however, any desirable value may be used. When the shut down signal from comparator C, goes low, the AND gate A is disabled. In addition, when the signal DCM not is low, indicating a small load, gate A is also disabled. That is, the DCM not signal is indicative of load conditions of a load connected the converter, for example, and goes low to reflect a small load. Discontinuous conduction mode is commonly the result of a small load.

Whenever gate A is disabled, the charge pump circuit 10 is OFF, i.e., the oscillator output from oscillator O is disconnected from the gates of Q1 and Q2. In this case, the voltage source V1 does not contribute to the output voltage and the output voltage is 5V (V2) less the two diode drops, ($D_{PV2}$, $D_{PV1}$) or 4.4V, as is noted above.

When the DCM not signal goes high, provided that the shut down signal output from the comparator C is not low, gate A is enabled and the oscillator signal is gated to the switches Q1 and Q2, switching the 3.3V supply V1, to charge capacitors $C_{PV1}$ and $C_{PV2}$ via node VS resulting in an increased output voltage of approximately 7V at node PVCC. Generally, the voltage at PVCC when the circuit 10 is ON will be a little below 7 volts.

Thus, when the charge pump circuit 10 is ON, the charge pump circuit 10 allows an increased gate driver supply voltage at node PVCC to be supplied to the gate driver when required to improve efficiency. When the charge pump is ON, the gate driver supply voltage is increased based upon the two supplies (V1, V2) to theoretically provide a total of 5V+3.3V=8.3 V. However, due to losses in the charge pump circuit 10, the PVCC voltage with the charge pump ON is approximately 7 volts.

Figure 2:
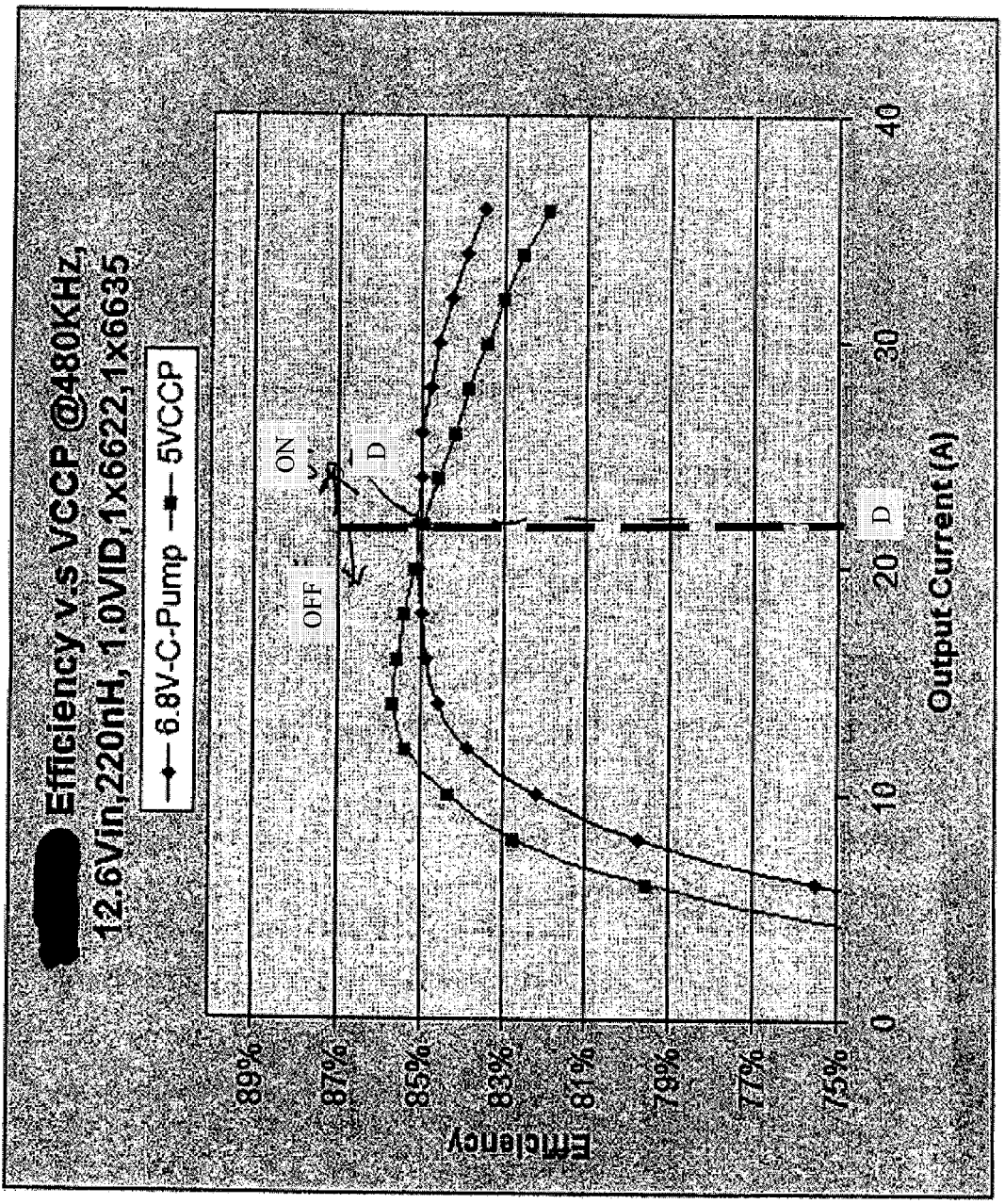
FIG. 2 is a graph illustrating efficiency of an exemplary voltage converter using and not using the charge circuit of FIG. 1.

FIG. 2 shows the efficiency of an exemplary converter circuit with and without the charge pump circuit 10. With the charge pump circuit 10 ON, the efficiency increases at full load but decreases at light load. Accordingly, the charge pump circuit 10 is preferably turned OFF where the two curves cross in FIG. 2.

The charge circuit 1 of the present application allows for an increased gate driver supply voltage at node PVCC to be supplied to the gate driver when required to improve efficiency. However, the charge pump circuit 10 may be turned OFF based on either the load condition as reflected by the DCM not signal, or the output voltage on node PVCC itself, based on the shut down signal from comparator C.

As noted above, the charge pump circuit 10 can be shut OFF as desired. For example, in a multi-phase converter, for example, a two phase converter, one of the power channels is often shut off during light load conditions. The charge pump circuit 10 is preferably shut off when this channel shuts off. It may also be desirable to be able to shut off the charge pump circuit 10 independent of the channels, for example, at half load or some other threshold. This threshold can be set as desired. Another driver may also be used to shut off the charge pump circuit 10, if desired. In any case, it may be useful to provide additional input signals to the gate A to control the turning ON and OFF of the charge pump circuit 10. The charge pump circuit 10 can be shut OFF as a function of the current supplied by the voltage converter to the load, for example.

The charge pump circuit 10 of the present application is preferably turned ON and OFF to increase efficiency by providing selected output voltages. A charge circuit 1 that is driven by two voltage supplies such as that described above provides an enhanced gate driver supply output voltage when desired. The charge pump circuit 10 is switched to keep the efficiency of the driven converter at an optimal level, as shown in FIG. 2. Preferably, the charge pump circuit 10 is turned OFF, when output currents fall below D in FIG. 2, and is turned ON when output currents are above D in FIG. 2. Thus, the charge pump circuit 10 is programmable based on the load conditions to maximize efficiency.

While the charge circuit 1 of the present application is specifically described herein as providing two different gate driver supply voltages at the output node PVCC based on load conditions in order to optimize efficiency of the voltage converter, for example, that the circuit 1 is used in, it is noted that the circuit 1 may provide additional output voltages as well. That is, as load conditions vary over a relatively wide range, in order to optimize efficiency, several different output voltages may be provided by the charge circuit in order to optimize efficiency. Generally, the larger the load, the more of an increase is desirable to increase efficiency. This may be accomplished by incorporating additional voltage sources, or by controlling a single voltage source, such as the source V1, for example, to provide a plurality of different voltages that may be used to enhance the output voltage of the charge circuit 1. Alternatively, the reference voltage VREF may be varied to vary the increase in the output voltage. A lower reference voltage would result in a smaller increase in the output voltage.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A charge circuit for providing a gate driver supply voltage for a gate driver of a switching power supply comprises:
   a first voltage source providing a first voltage; and
   a charge pump circuit connected to the first voltage source and operable to be turned ON and OFF to improve efficiency such that an increased output voltage of the charge circuit, above the first voltage, is provided when the charge pump circuit is ON, wherein the charge pump circuit is turned OFF when a load current of a load connected to the switching power supply output drops below a desired level and is turned OFF when a discontinuous conduction mode signal indicates a small load, and wherein the output voltage is the gate driver supply voltage.

2. The charge circuit of claim 1, wherein the first voltage source is connected to an output node of the charge circuit via a first diode and a second diode such that the output voltage depends on the first voltage and values of the first and second diodes when the charge pump circuit is OFF.

3. The charge circuit of claim 2, wherein the charge pump circuit further comprises:
a second voltage source providing a second voltage;
a first switch connected to the second voltage source;
a second switch connected is series with the first switch; and
a control unit operable to provide a control signal to the first switch and the second switch to selectively turn the first and second switch ON and OFF to control a desired voltage at a first node positioned between the first and second switches.

4. The charge circuit of claim 3, wherein the first node is coupled to a second node, positioned between the first and second diodes via a first capacitor such that the desired voltage at the first note charges the first capacitor when the charge pump circuit is ON to increase the output voltage.

5. The charge circuit of claim 4, wherein the control unit is implemented as an AND gate, and wherein the charge pump circuit further comprises:
a voltage divider operable to receive a feed back signal representing the output voltage and to provide a divided voltage signal indicating the output voltage; and
a comparator connected to the divider circuit to receive the divided voltage signal as one input and a reference voltage as a second input, and operable to provide a shut off signal which has a low value when the divided voltage signal exceeds the reference voltage.

6. The charge circuit of claim 5, further comprising an oscillator providing an oscillator signal to the control unit at a set frequency, wherein the control signal is based on the oscillator signal to switch the first and second switches to provide the desired voltage at the first node.

7. The charge circuit of claim 6, wherein the shut off signal, the oscillator signal and said discontinuous conduction mode signal, that has a low value when said load current of said load connected to the switching power supply drops below a desired level indicating a small load, are provided as inputs to the AND gate and the control signal provided from the AND gate turns the second switch OFF when at least one of the shut down signal and the discontinuous mode signal are low.

8. A charge pump circuit providing a gate driver supply voltage for a gate driver of a switching power supply comprises:
a voltage source providing a voltage;
a first switch connected to the voltage source;
a second switch connected is series with the first switch; and
a control unit operable to provide a control signal to the first switch and the second switch to selectively turn the first and second switch ON and OFF to control a desired voltage at a first node positioned between the first and second switches, wherein the control unit turns the charge pump circuit OFF when a load current of a load connected to the switching power supply output drops below a desired level and when a discontinuous conduction mode signal indicates a small load to increase efficiency.

9. The charge pump circuit of claim 8, wherein the control signal turns the first switch and the second switch OFF when a small load is connected to the charge pump circuit.

10. A charge circuit for providing a gate driver supply voltage for a gate driver of a switching power supply comprises:
at least one voltage source providing a first voltage; and
a charge pump circuit connected to the first voltage source and operable to be turned ON and OFF to improve efficiency of the switching power supply, wherein the charge pump circuit is turned ON to increase the output voltage of the charge circuit above the first voltage when a large load is connected to the switching power supply and OFF when a load current of a load connected to the switching power supply output drops below a desired level and when a discontinuous conduction mode signal indicates a small load.

11. The charge circuit of claim 10, wherein an amount by which the output voltage is increased varies depending on a load condition of the load connected to the switching power supply, such that a plurality of increased output voltages are provided by the charge circuit in order to maximize efficiency of the switching power supply.

* * * * *